United States Patent [19]

Walker

[11] Patent Number: 4,750,376
[45] Date of Patent: Jun. 14, 1988

[54] VARIABLE GEAR RATIO/SPEED DRIVE

[76] Inventor: Harold L. Walker, 2566 Gary Cir., Apt. 9, Dunedin, Fla. 33528

[21] Appl. No.: 832,299

[22] Filed: Feb. 24, 1986

[51] Int. Cl.$^4$ .................... F16H 27/10; F16H 29/00; F16H 21/12
[52] U.S. Cl. ........................ 74/125.5; 74/63; 74/116; 280/259
[58] Field of Search ................ 74/63, 116, 125.5, 393, 74/395, 805, 804, 750 B; 474/112; 280/259, 260

[56] References Cited

U.S. PATENT DOCUMENTS

| | | | |
|---|---|---|---|
| 3,081,641 | 3/1963 | Iseman | 474/70 |
| 3,116,650 | 1/1964 | Farley | 74/804 X |
| 3,529,480 | 9/1970 | Kaspareck | 74/63 |
| 4,129,044 | 12/1978 | Erickson et al. | 474/55 |
| 4,159,652 | 7/1979 | Trammell | 280/259 X |
| 4,164,153 | 8/1979 | Moritsch et al. | 474/70 |
| 4,277,986 | 7/1981 | Waddineton | 74/750 B |
| 4,399,716 | 8/1983 | Karlsson | 74/125.5 |
| 4,449,425 | 5/1984 | Carden | 74/804 |
| 4,494,416 | 1/1985 | Evans | 74/125.5 X |

FOREIGN PATENT DOCUMENTS

| | | | |
|---|---|---|---|
| 55-78822 | 6/1980 | Japan | 74/63 |
| 224824 | 3/1943 | Switzerland | 280/259 |
| 23423 | of 1896 | United Kingdom | 280/259 |
| 2035478 | 6/1980 | United Kingdom | 74/63 |

Primary Examiner—Dirk Wright
Attorney, Agent, or Firm—Nolte, Nolte and Hunter

[57] ABSTRACT

A transmission in which gear segments are cammed to mesh with a circumferential gear and to transmit power from a centered shaft through arcs of power determined by the position of segments relative to the shaft. The segments automatically adjust the radii from shaft to segment in reaction to the torque transmitted from the shaft.

14 Claims, 3 Drawing Sheets

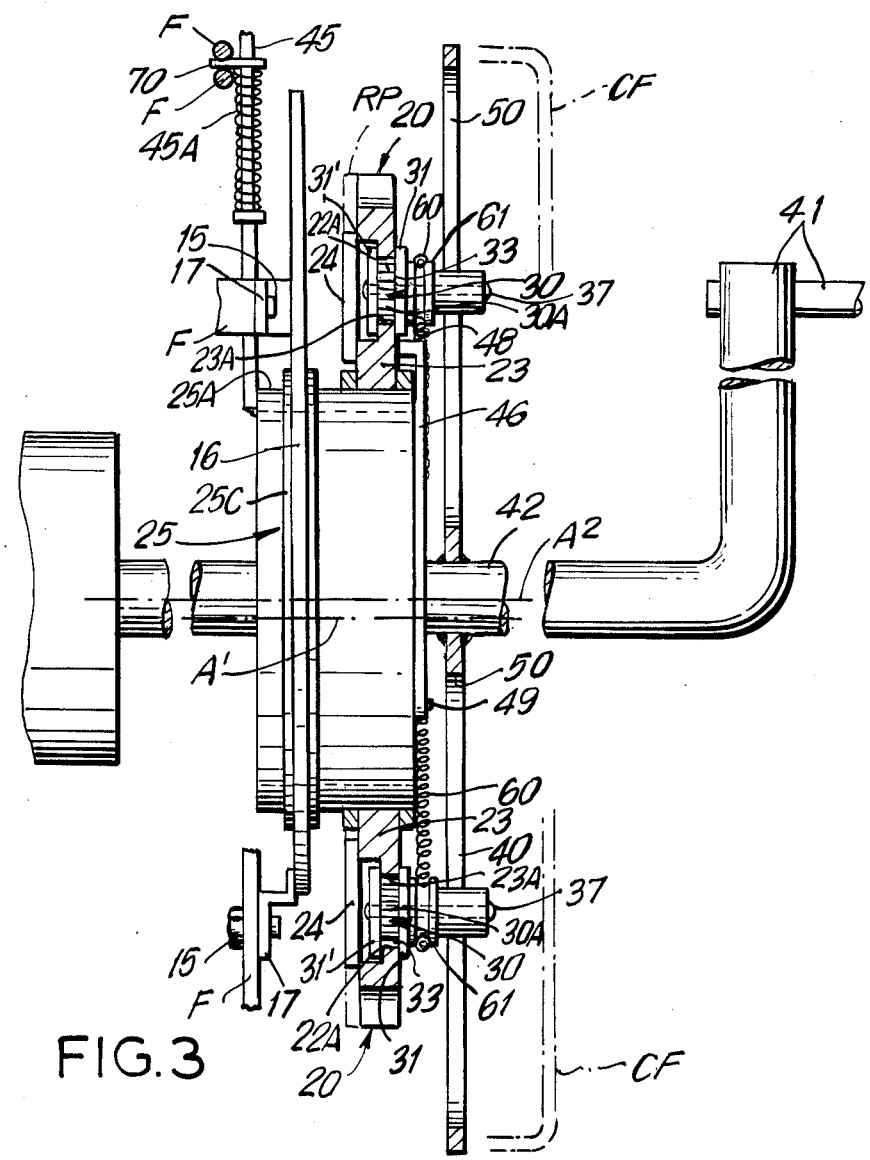
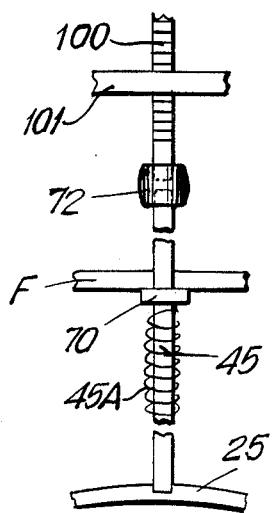
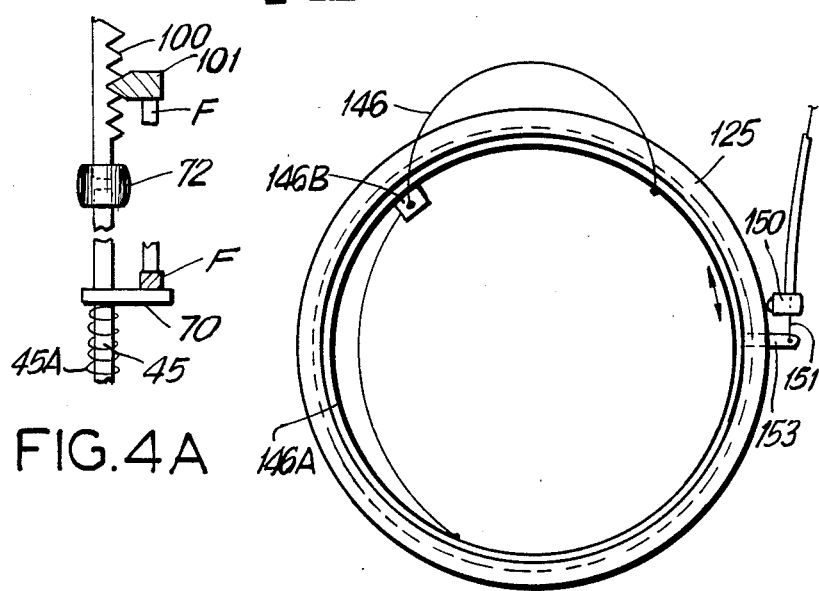
FIG.3
FIG.4
FIG.4A
FIG.5

4,750,376

VARIABLE GEAR RATIO/SPEED DRIVE

FIELD OF THE INVENTION

This invention relates generally to drive transmissions and more particularly to infinitely variable drive transmissions, useful in chain/pulley and direct drive applications.

BACKGROUND OF THE INVENTION

Transmission mechanisms which are movable relative to a power shaft to increase and decrease the radius of an arcuate power stroke delivered to a driven member are typified by the structures disclosed in U.S. Pat. Nos. 4,129,044 to Erickson et al and 4,164,153 to Moritsch et al. Typical gear change mechanisms which utilize rotationally associated inner and outer drive and driven members can be seen in the just noted patent to Moritsch et al and in U.S. Pat. No. 3,081,641 to Iseman.

A number of devices which include a chain wheel and a pedal crank shaft having toothed ratchet mechanisms interposed therebetween are disclosed in those patents classified in Class 180, subclasses 230, 231; Class 280, subclasses 236, 238, 251, 259, 260, 261, 262 and 431; Class 284, subclasses 431 and Class 474, subclasses 55, 69 and 70 and Class 74, subclasses 190, 190.5, 194, 393 and 810.

Automatic variation in the gear pitch and thus the power arc of a transmission; and in the transmission ratio between a transmission and its driven element, as partially achieved in transmissions of the type typified in the above-mentioned Moritsch et al construction, present problems not heretofore resolved, including the achievement of smooth unmeshing of driving and driven members after passing through the power arc of rotation, the provision of automatic changes in the gear pitch, and thus in the ratio of transmission, through the full range capacity of the transmission, and of optional modes of manual and automatic operations.

Furthermore, transmissions of the infinitely variable type of the prior art tend to be complicated and include a large number of parts for their operation.

THE INVENTION

The objects of the present invention in variable ratio transmissions, are the provision of automatic gear pitch control throughout the full range capacity of the transmission, infinitely variable ratio, automatic shift to both higher and lower ratios, optional manual shift, shifting under torque, higher efficiency in the most used ratios, torque sensitive power shifting and shifting in non-operating mode, as well as under torque, high ratio transmission, and locking into gear or ratio of choice. Additionally, the present invention provides such a transmission which may be enclosed for dirt-free operation, is light-weight and requires minimal maintenance.

In one embodiment of the infinitely variable transmission of the present invention there is provided an output drive assembly comprising a circular gear member having a circumferentially toothed gear surface, a circular gear segment race having a circumferential race surface radially spaced from and juxtaopposed to the gear surface, the gear member and race being integral and having a common axis, an inner bearing about which the gear member and integral race rotate and are supported, a plurality of gear segments mounted between the gear surface and race surface for rotation on the race, with spring means for slightly biasing them radially for retaining the gear segment assemblies on the race with the teeth of the segments spaced from the teeth of the hear surface, a gear segment cam pivotally mounted on the bearing, and a control arm secured to the bearing and which restrains the bearing against rotation, other than rotation imparted to it by the control arm and which may be used for manual positioning of the output drive assembly. An axial extension of the bearing is disposed within parallel preferably arcuate guide surfaces of a guide member which mounts the entire assembly.

The plurality of gear segments, each having a multiplicity of teeth engage the teeth of the circumferential gear member through a power arc of their rotational strokes, the circumferential extent of the arc being determined by the position of the cam and of the gear segment relative to the axis of a drive shaft. The output drive assembly is movable relative to and in a plane normal to the axis of the drive shaft to increase and decrease the radius of the power arc and is driven about its bearing by the power shaft through a power disc which is connected to the shaft and provides radial slots which guide the gear segments radially as the output drive assembly is moved. As the power disc rotates, it delivers rotational power to the gear segments and thus to the output drive assembly.

The output drive assembly is guided by the guide member so that its center is offset from the axis of the drive shaft when in the lower ratio mode; i.e., when the radius of the power arc stroke, from drive shaft axis to gear segment, is short, to effect a slightly longer radius at the end of the power arc for quick disengagement of the gear segment at the end of its power stroke as the next segment engages the gear surface of the output drive member under torque. For the same purpose, the output assembly is moved in a slight arc, via the arcuate surfaces of the independently mounted guide member, away from the power shaft axis as lower transmission ratios are approached. In a bicycle transmission, this arc, conveniently, may be defined by curving the guide along an arc with a radius extending from the rear axle of the bicycle to retain chain tension.

Importantly in one embodiment of the invention, the bearing of the output drive assembly is rotatable via the control arm to position the gear segment cam and, therefore, the engagement of the segments with the circumferential gear at points before and after a neutral plane extending normal and parallel to the axis of the power output assembly. In another embodiment of the invention, cam positioning or repositioning is eliminated where automatic gear ratio change from high to low is not desired. In yet another embodiment, the cam is mounted for rotational positioning independently of the bearing so that automatic gear ratio change or pitch control (the change in the extent of the power arc) is effected independently of the movement of a control arm and may be used in combination with a control arm where manual movement of the power output drive assembly and automatic pitch control are both desired.

When the gear segments are cammed to mesh with the associated teeth on the output drive member before passing through the neutral plane, the output drive assembly is automatically moved to increase the radius of the power stroke by the rotating gear segments in response to the torque effected on the power disc through the shaft.

Similarly, when the gear segments mesh with the associated teeth on the output drive member after passing through the neutral plane, the rotational force of the gear segments moves the power output drive assembly to decrease the radius of the power stroke.

The control arm or equivalent control mechanism may be used to hold the output drive assembly locked in any position relative to te drive shaft and may also be used to manually move the output drive assembly to increase or decrease the radius of the power stroke.

In this last respect, the control arm and thus the power output drive assembly may be biased when the assembly is moved through the mid to low gear ratio positions, particularly when the output drive assembly is mounted for vertical movement, to restrain the assembly against gravitational forces. The control arm may also be biased throughout the low to mid and mid to high gear ratio positions to assist movement of the assembly in the low to mid range and to restrain movement in the mid to high range. In one embodiment of the invention a spring, operable only in the mid to low range operates between the control arm and the frame of a bicycle or machine; in another, the control arm itself is an extended bar spring and operates to shift; i.e., move the assembly, and bias it at the same time.

BRIEF DESCRIPTION OF THE DRAWINGS

FIG. 3 is a diagrammatic end view, partially in section, of the transmission of FIGS. 1 and 2 showing some details of construction;

FIGS. 4 and 4A are diagrammatic front and side views of the upper portions of the control arm of the transmission of FIGS. 1-3;

FIG. 5 is a diagrammatic front view of a gear segment race bearing and separately rotatable gear segment cam;

DETAILED DESCRIPTION OF THE PREFERRED EMBODIMENT

Figure 2:
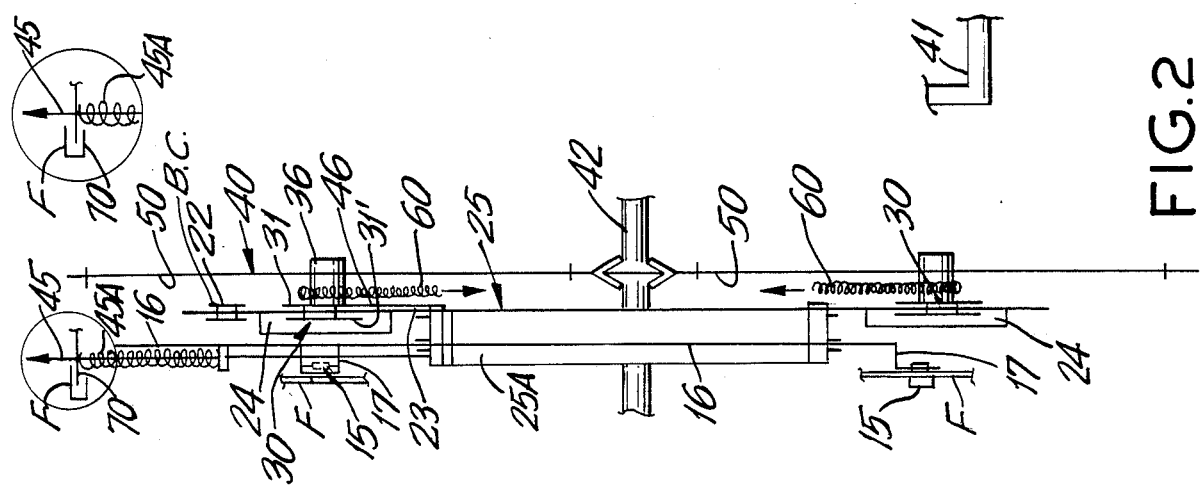
FIG. 2 is a diagrammatic end view of the transmission of FIG. 1 taken along the lines 2—2 of FIG. 1.
Figure 1:
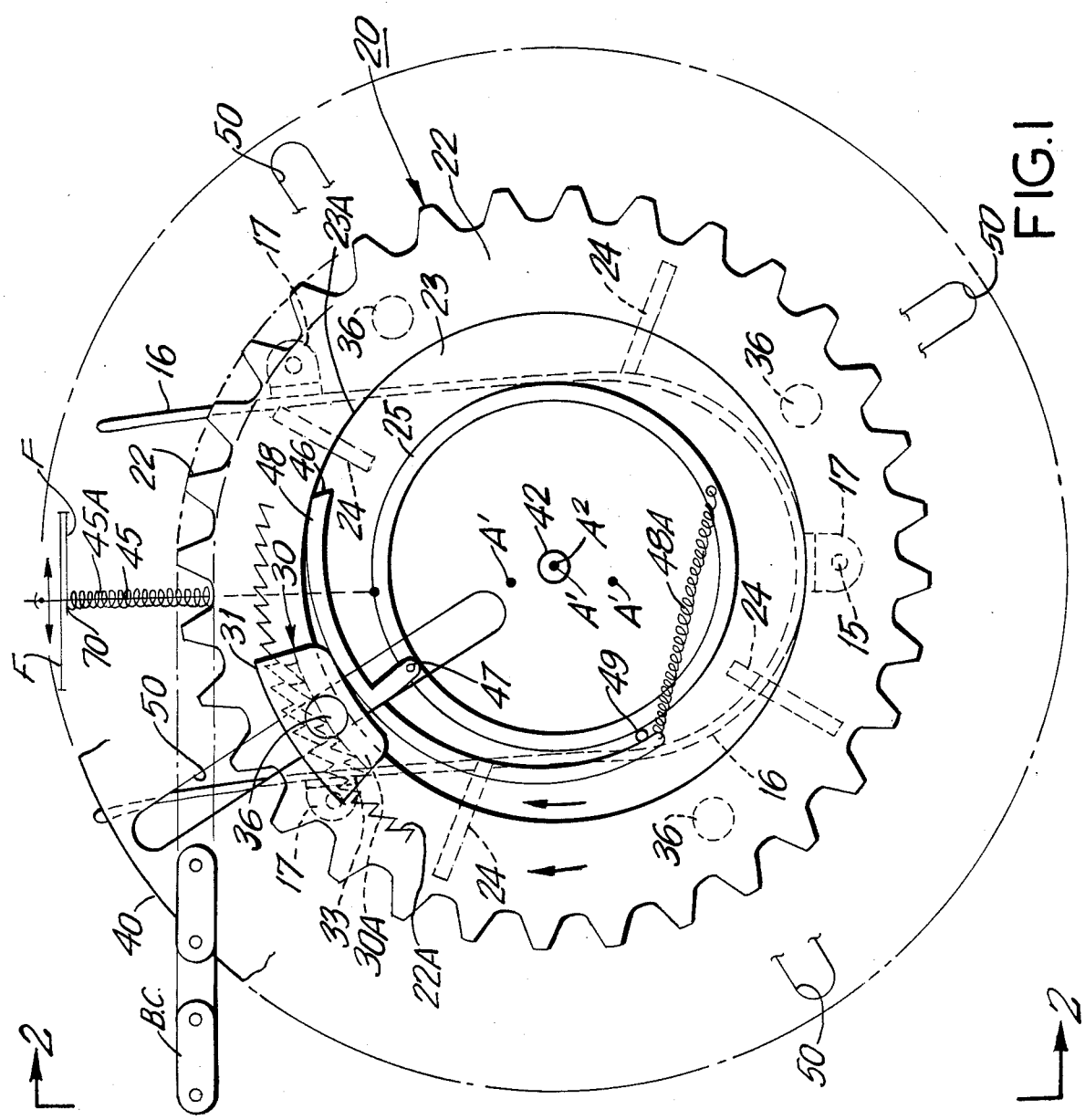
FIG. 1 is a diagramatic side elevational view showing the transmission of the invention as applied to a bicycle.

The transmission depicted in FIGS. 1-3 is a bicycle transmission, however, the mechanical principles and structures are applicable to transmissions for use in any machinery drive where variable output speeds are desirable.

In FIGS. 1-3, bolts 15 secure guide member 16 to bicycle frame F via guide ears 17.

The output drive assembly is a driven chain wheel assembly 20 comprising sprocketed outer ring 22, gear segment race 23 with which sprocketed outer ring 22 is made integral, in the present instance, via weld bars 24, and gear segment race bearing 25, positioned for vertical movement, restrained and guided via sliding contact between the outer circumferential surface 25A of gear segment race bearing 25 and the parallel arcuate guide arms of guide member 16 which are contained between spaced flanges shown in FIG. 3 (diagrammatically in FIG. 2) straddling member 16 and which are integral with bearing 25. In FIG. 3, the surface 25A of race bearing 25 is provided with an integral collar 25C, having an arcuate circumferential groove which receives the arms of guide 16 in assembly and permits rotation of the bearing.

An inner circumferential surface of sprocketed outer ring 22 is toothed as at 22A to mesh with the corresponding multiplicity of teeth of gear segments 30 which drive the sproketed outer ring 22 and integral gear segment race 23 about gear segment race bearing 25, in the direction of the arrows in FIG. 1, via rotation of a driven slotted driving disc 40 keyed or otherwise secured to drive shaft 42 of pedal drive 41. The bearing 25 is annular in this instance to accommodate shaft 42. It has been found that a minimum of four gear segments are required for smooth operation and more than four are preferable; e.g., six, eight, ten, twelve gear segments, etc. It has been determined that the extended circumferential length of the gear segments including a plurality of teeth provides smooth engagement of the gear segments with the teeth of ring 22 with slippage minimized or eliminated.

The assembly 20 also includes control arm 45 secured at its lower end to gear segment race bearing 25, its upper end slidably received in a frame member F, and which restrains rotation of the bearing 25 and is used to effect clockwise and counter-clockwise movement of the gear segment race bearing 25, within guide element 16, and resultingly of gear segment cam 46, also a part of assembly 20, pivoted to the gear segment race bearing 25 at 47 to present upper cam surface 48 and gear segment assembly 30 at positions between fore and aft of a central plane normal and parallel to and passing through the axis $A^1$ of driven chain assembly 20. The axis $A^1$ is moved with the assembly to above and below the axis $A^2$ of the drive shaft 42, and is positioned by guide element 16, offset to the left and below the axis of the drive shaft 42 when lowered to decrease the radius of the power arc between the shaft axis and the gear segments in the lower speed or ratio modes. Thus, the radius of the power arc is longer when the gear segment approaches the end of cam surface 48 and the gear segment is released from torque and off the cam and out of engagement with the inner teeth of the sprocketed outer ring just as soon as the next gear segment is engaged with the inner teeth of the sprocketed outer ring to take up the torque transmitted from the drive shaft.

The lower end of cam 46 is secured to one end of spring 46A, the other end of spring 46A being secured to gear segment race bearing 25 to bias cam surface 48 upwardly about pivot 47. A stop member 49 restrains radial inward movement of the lower end of cam 46 against the bias of spring 46A and accurately disposes the cam surface 48 for engagement of the gear segment body 30A for meshing of the inner teeth of sprocketed outer ring 22 and the teeth 33 of gear segments 30.

The gear segment shields 31, 31' which may be integral with gear segment body 30A, are disposed along the sides of the segments 30 in the front and to the rear of gear segment race 23 and outer sprocket ring 22 to retain the gear segment assemblies, when not meshed with the teeth of ring 22, in their circumferential path of travel between the outer surface 23A of gear segment race 23 and toothed inner surface 22A of sprocketed outer ring 22. The gear segment drive pins 36 which extend axially through the slots 50 of slotted driving disc 40 are secured to the hear segments in any conventional manner, as by swaged ends of pin 37 (FIG. 3)

about which the gear segment, including the drive pin, may be rotatable.

As shown in FIGS. 2 and 3, a spring 60 bands around the collars 61 on each drive pin 36 to retain the gear segments on the gear segment race. Only slight spring pressure is required for this purpose and any equivilant restraining structure may be used for the same purpose.

When the control arm 45 and thus the gear segment cam is in the fore position (to the left of the neutral plane in FIG. 1) the torque transmitted to the output drive assembly will automatically move the assembly upwardly to increase the radius of the power arc and thus the gear pitch between the beginning and end of the power stroke of the gear segment.

As shown diagrammatically in FIGS. 1 and 2, a spring 45A is secured at its lower end to a median point on control arm 45 and at its upper end to a slide 70 (FIG. 3 only). When the arm 45 is rotated about axis $A^1$ to the right as viewed in FIG. 1, to the aft position the spring engages the frame via slide 70, but does not engage the frame in the fore position. When in the aft position, spring 45A biases the driven power output chain wheel assembly 20 radially upwardly so that the assembly 20 will not fall under the influence of gravity, but will be permitted to travel in the downward direction against the bias of spring 45A under the influence of the torque load transmitted to the assembly 20 via disc 40 and gear segments 30.

A cover CF shown partially in phantom in FIG. 3 may enclose the front of the drive disc thus shielding the gear segment assemblies and the power output assembly from dust. Similarly, an annular rear plate RP, shown partially in phantom in FIG. 3, may be substituted for the weld bars 24 to provide dust cover protection to the assembly from the rear side.

Manual control of the speed of the output drive assembly may be provided in several ways. In FIGS. 4 and 4A, the control arm may be stopped at any desired position of the output drive assembly by interengaging groove detent elements 100 on the arm 45, and tooth elements 101 on the frame. For this purpose, a turnbuckle 72 is provided permitting rotation of the upper portion of arm 45 about its axis.

Fully automatic gear change can be provided as in FIG. 5 with the elimination of a control arm by mounting the gear segment cam 146, in this instance a preformed spring wire, independently of the gear segment bearing 125, upon a ring mount 146A via bearing 146B. The ends of the wire cam are fitted against the inner periphery of the mount to stabilize the cam. A control cable support 150 may be secured to the race bearing, the cable 151 being secured to the ring mount via cable wire finger 153. The ring mount is rotatably mounted via a groove formation, for example, on the inner periphery of the race 125. Movement of the cable 151 effects clockwise and couterclockwise movement, as indicated by the two headed arrow in FIG. 5, of the mount and, therefore, of the cam 146 to and from the fore, aft and neutral positions to effect automatic lifting and lowering of the output assembly as the transmission reacts to torque, as above described.

Figure 6:
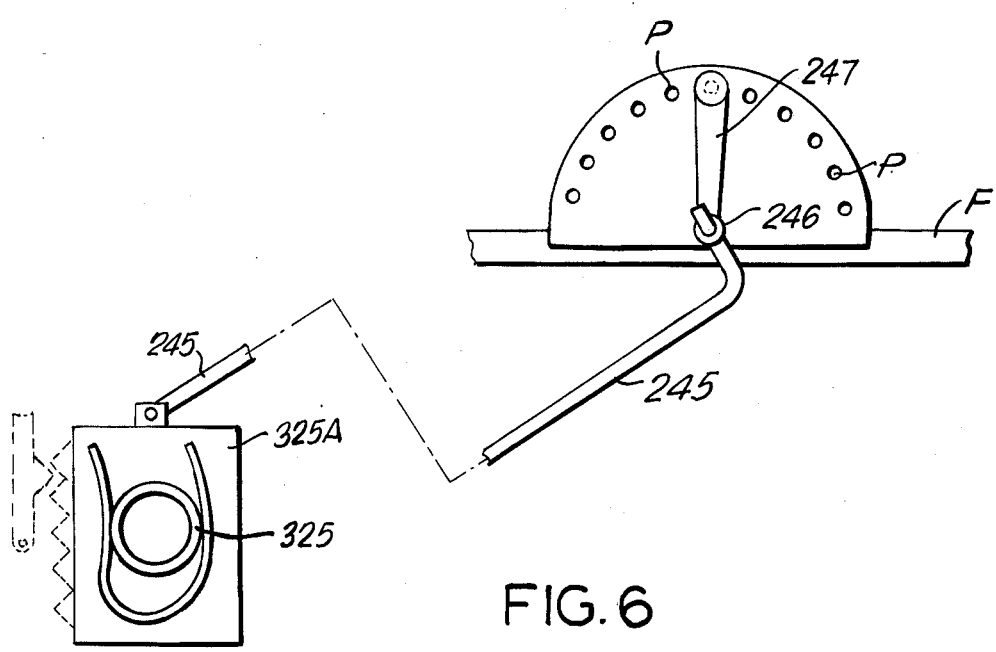
FIG. 6 is a diagrammatic front view of a cam race bearing and spring rod control arm of a modification of the invention.

In FIG. 6, a manually controlled transmission of the invention is disclosed and in which the control arm 245 is an extended bar spring. One end of the spring arm is secured to the end of a turn shaft 246 rotatable by movement of the upper end of lever 247 from and to positions P, along an arcuate stopper/indicator where it may be temporarily secured in a well known manner.

As the shaft 246 is turned, the bar spring control arm, which is connected to an extension 325A from the race bearing 325, the bearing 325 and thus the whole power output assembly (not shown) will be lifted or lowered. In this embodiment, the cam (not shown) may be secured to the assembly and not movable relative to the race; or it may be mounted for movement fore and aft of the neutral plane as in FIG. 5 for automatic transmission variation upon shifting the lever away from stops at the position P.

As can be appreciated, the cam may be positioned and secured for either automatic gear change from low to high or from high to low; or between mid and low or mid and high ratios.

Similarly, the bearing extension 325A may be cocked from the vertical thus tilting the bearing and cam to set the beginning and end of the power arc as desired and to effect increasing of the radius of the power arc in the higher ratio of transmission as discussed, supra.

The bias in the spring bar control arm may be upward to restrain against gravity forces exerted on the assembly when moving downwardly through the high to low gear ratio positions and to assist lifting of the assembly moving upwardly in the low to high gear positions; or so that spring exertion is imparted only in the mid to low or in the mid to high positions of the assembly. The bias of the spring bar may be downward for effecting quick down-gearing from mid-cam-position, for example, with lever 247 disassociated from the stops P. As can be appreciated, the constructions of the invention lend themselves to a wide variety of alternative choices of operation.

It is noted here that the extension 325A of race bearing 325 may be used as an alternate position retention element by providing detent slots along its side (phantom lines in FIG. 6) for mating with a toothed stopper movable into and out of the detent teeth along the path of travel of the assembly.

Figure 7:
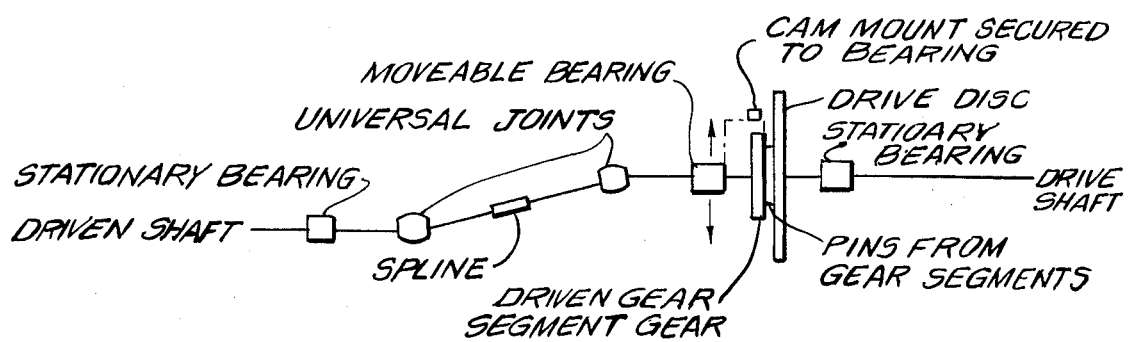
FIG. 7 is a diagrammatic side view of a power train employing the transmission of the invention in a machine in which the power output assembly connects a direct output drive shaft, rather than a sprocketed wheel driving a chain.

In FIG. 7, the invention is disclosed in an industrial application in which the drive disc is driven by a drive shaft and, in turn, drives the power output assembly through the gear segment pins. The output assembly directly connects the output shaft which, together with the assembly, is moved to increase or decrease the radius of the power stroke of each gear segment.

In such a construction, the circumferentially toothed surface faces radially outwardly from the outer surface of a central cylindrical member and the gear segment race is positioned on the inner circumferential surface of the outer ring previously described as the output drive member. Springing the segments radially will not be necessary in this construction, as centrifugal force in the rotating output assembly will retain the segments on the race until cammed to mesh with the teeth of the central members.

The central member and the gear segment race are integral, as in one previously described embodiment.

The position of the gear segments has been changed so that the cam may be operated, if desired, from outside the transmission, mounted, for example, on the bearing of the output shaft of the transmission.

The output shaft is connected through conventional joints to a stationary driven work shaft.

As can be appreciated, the structures of the invention lend themselves to hydraulic activation and actuation within lubricated enclosures and to activation via electro-magnets which should prove very efficient.

Various other modifications of the invention will now occur to those skilled in the art. The spirit and scope of the invention are defined in the following claims.

I claim:

1. A transmission comprising a circumferentially toothed gear and a circumferential race radially spaced from and integrally connected with said gear, means connecting said circumferentially toothed gear and said circumferential race, said gear and race being rotatable together about a common axis, a plurality of gear segments, each having a plurality of teeth along one surface thereof for meshing with teeth of said toothed gear and having a cam receiving surface along an oppositely facing surface and each gear segment being disposed within the space between said gear and said race, said segments being circumferentially spaced from one another and radially movable in said space from a position on said race to a position meshing with the teeth of said gear, said segments including axially extending torque receiving means, means mounting said integral gear and race for rotation about said common axis, means for guiding said mounting means and said integral gear and race in a plane normal to said common axis, a power member extending radially from and connecting a power shaft, said power shaft having an axis parallel to said common axis of said gear and race and extending from a power source, said power member including radially extending transmitting and guiding surface means for transmitting torque from said shaft to said torque receiving means of said segments along radii determined by the position of said integral gear and race in the said plane, and cam means mounted for contacting said cam receiving surface of said gear segments and for guiding said gear segments to the meshing position with the teeth of said gear through an arc determined by radii from the power shaft axis to the meshing teeth of said gear and gear segments and having a camming surface which terminates for permitting disengagement of each gear segment from torque engagement with the teeth of said gear as a following gear segment is moved into meshing engagement with said gear.

2. The transmission of claim 1, wherein said means for mounting said gear and race for rotation about a common axis comprises a bearing upon which said integral gear and race rotate.

3. The transmission of claim 2, wherein said guiding means comprises substantially parallel surfaces on either side of and slidably contacting said bearing.

4. The transmission of claim 1, wherein said means for guiding said mounting means and said integral gear and race for planar movement in a plane normal to said common axis comprises means for guiding the common axis of said gear and race to a position laterally offset from the axis of said power shaft for increasing the arc through which said gear segments are in the meshing position during camming of said gear segments by said cam means.

5. The transmission of claim 3, wherein said parallel surfaces comprise means for guiding the common axis of said gear and race to a position offset from the axis of said power shaft for increasing the arc through which said gear segments are in the meshing position during camming of said gear segments by said cam means.

6. The transmission of claim 2, wherein said cam means are mounted on said bearing and means are provided for circumferentially moving said cam means from and to positions disposing said gear segments so as to constitute said gear segments as torque reactive means for moving said integral gear and race in the plane normal to said common axis to increase the radii from the power shaft axis to the meshing teeth of said gear and gear segments and for moving said transmission in a plane normal to said common axis to decrease the radii from said power shaft axis to the meshing teeth of said gear and gear segments.

7. The transmission of claims 1 or 6, including means for locking said gear and race along selected points of its line of movement in the plane normal to said common axis.

8. The transmission of claims 1 or 6, including means for biasing said integral gear and race in at least one direction in its line of movement in a plane normal to said common axis.

9. The transmission of claim 1, wherein said gear segments each include at least one lateral guard having a surface for camming by said cam means.

10. The transmission of claim 1, wherein means are provided for biasing said gear segments on said race.

11. The transmission of claim 1, wherein said toothed gear includes an outer periphery formed with bicycle chain sprockets.

12. The transmission of claim 1, wherein cover means are secured over said power member.

13. The transmission of claim 1, wherein said transmitting and guiding means of said power member include radial slots and said axially extending torque receiving means of said gear segments comprise pins extending through said slots.

14. The transmission of claim 9, wherein said gear segments include a pair of lateral guards straddling said race and comprising means for retaining said segments radially aligned on said race when said segments are out of mesh with the teeth of said toothed gear.

* * * * *